Jan. 26, 1932.   F. C. AREY   1,842,382
POWER OPERATED VALVE
Filed Sept. 4, 1930   4 Sheets-Sheet 1
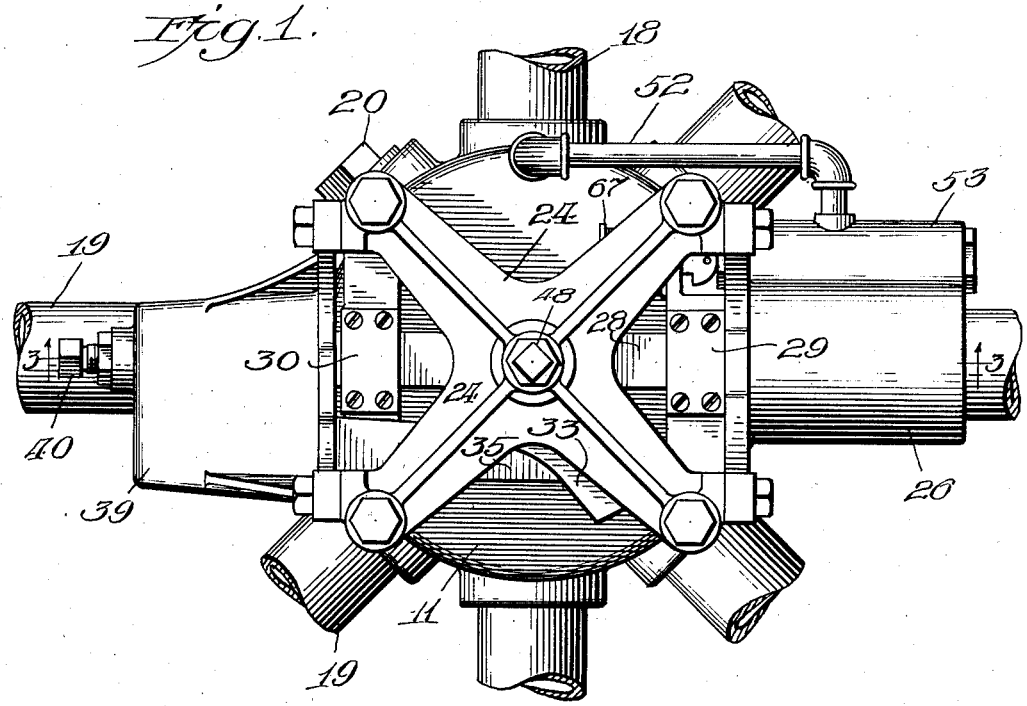
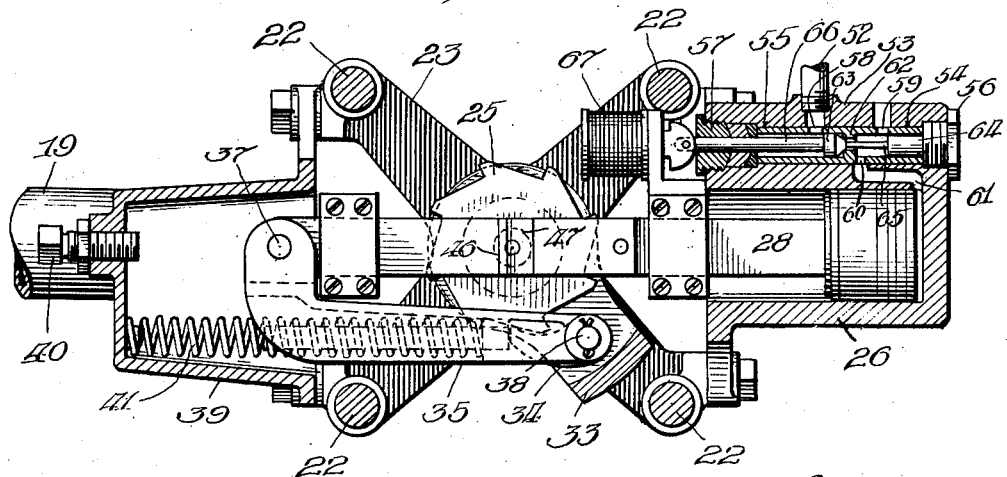

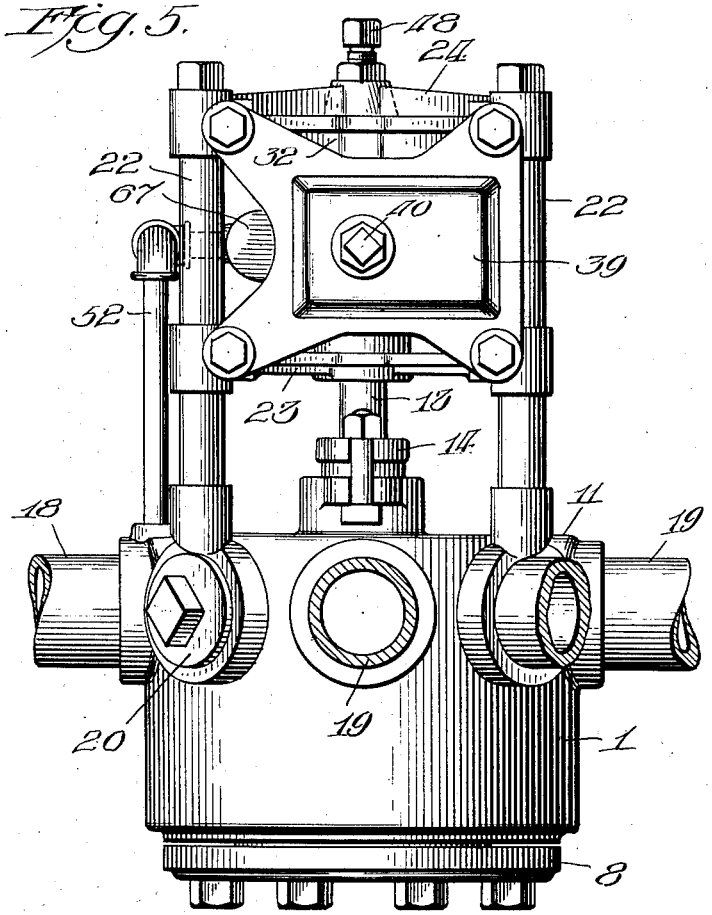
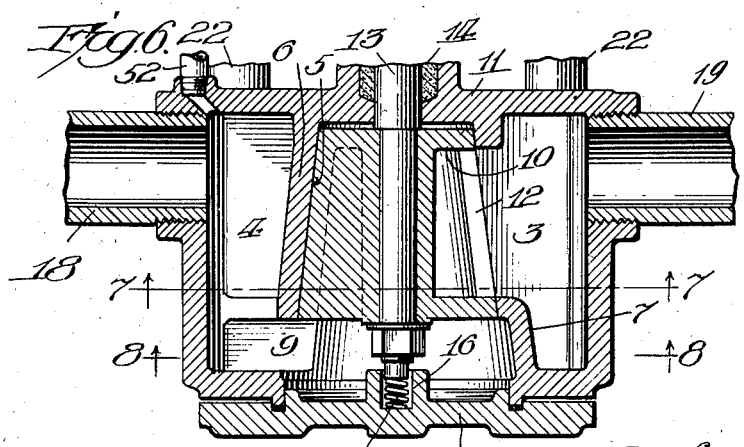

Jan. 26, 1932.                F. C. AREY                 1,842,382
                          POWER OPERATED VALVE
                        Filed Sept. 4, 1930      4 Sheets-Sheet 4
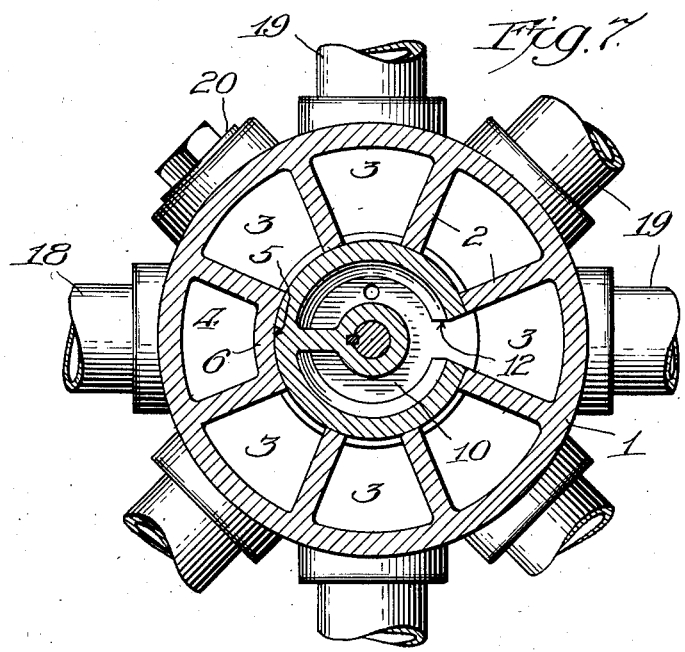
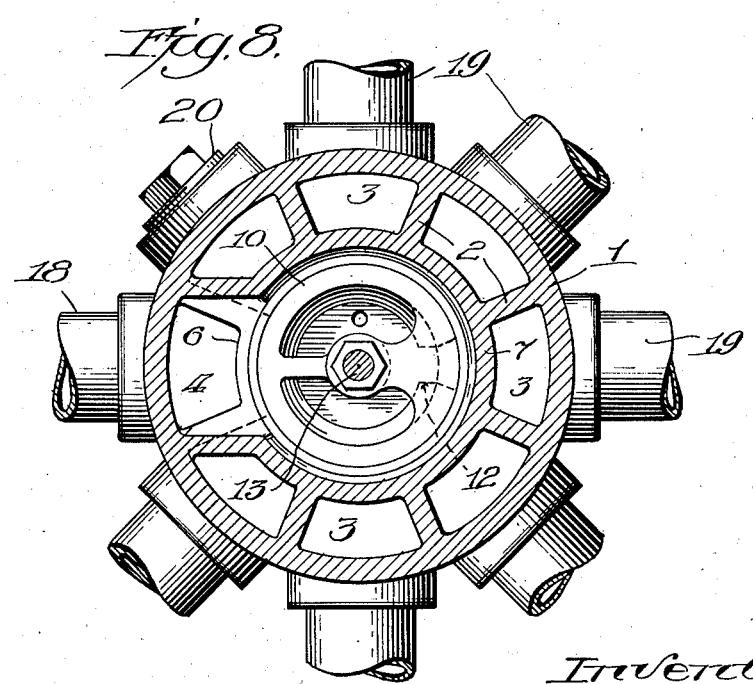

Patented Jan. 26, 1932                                              1,842,382

UNITED STATES PATENT OFFICE

FRED C. AREY, OF OAK PARK, ILLINOIS, ASSIGNOR TO VULCAN SOOT CLEANER COMPANY, OF DU BOIS, PENNSYLVANIA, A CORPORATION OF NEW JERSEY

POWER OPERATED VALVE

Application filed September 4, 1930. Serial No. 479,647.

The present invention relates to valves for connecting a supply pipe for steam or other fluid under pressure successively to a plurality of pipes and has for its object to produce a valve mechanism of this kind that will be simple in construction, reliable and be easily operated.

A further object of the present invention is to produce a simple and novel operating means for a rotary valve of the plug type, whereby the valve will be "cracked" before the turning forces are applied thereto.

A further object of the present invention is to produce a simple and novel valve mechanism including a rotary valve having a considerable number of positions, and power operating means to move the valve step by step and permit it to come to rest at the end of each step in a working position.

Figure 3:
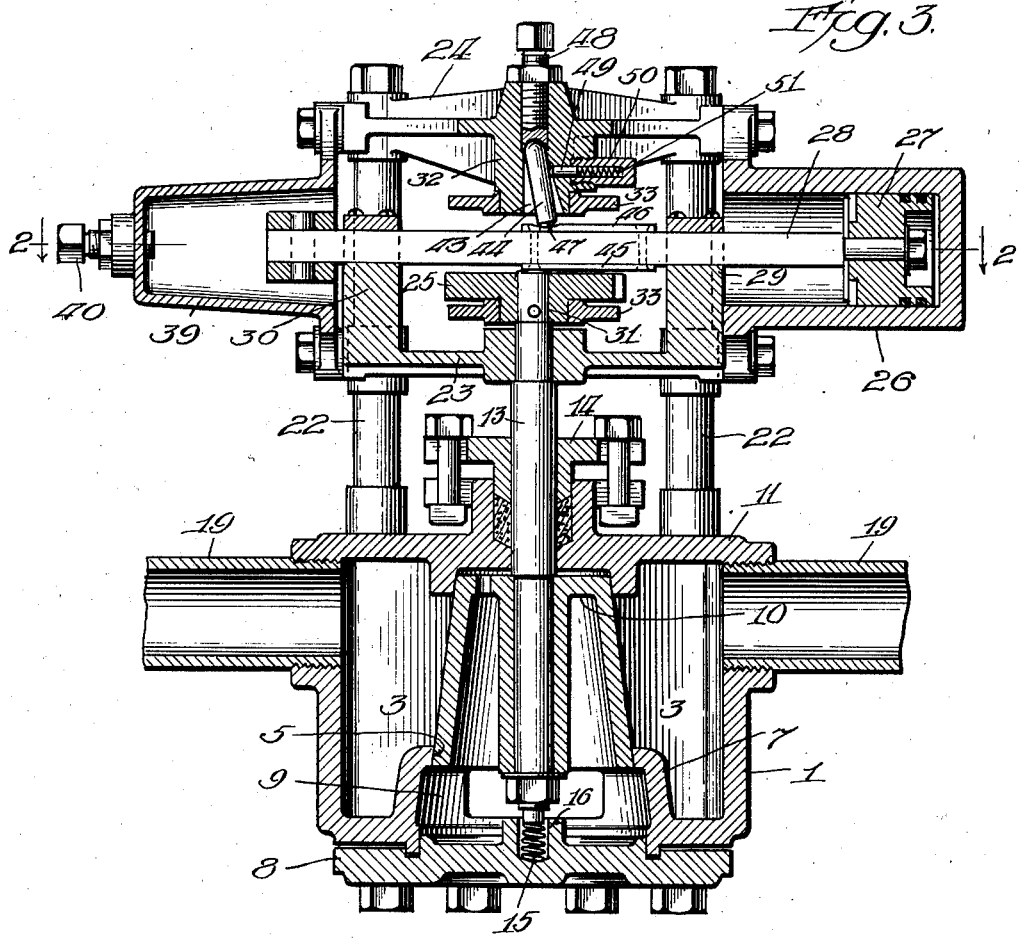
Figure 4:
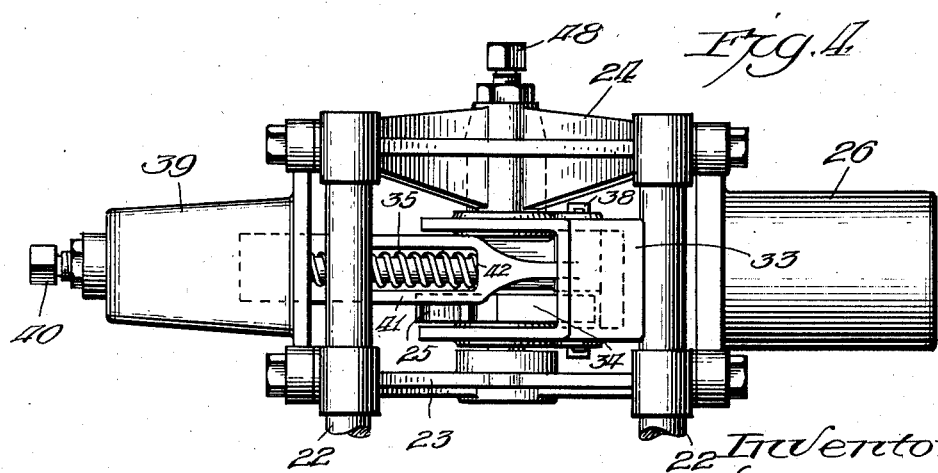

The various features of novelty whereby my invention is characterized will hereinafter be pointed out with particularity in the claims; but, for a full understanding of my invention and of its objects and advantages, reference may be had to the following detailed description taken in connection with the accompanying drawings, wherein:

Figure 1 is a top plan view of a mechanism arranged in accordance with my invention; Fig. 2 is a horizontal section taken approximately on line 2—2 of Fig. 3; Fig. 3 is a vertical section taken approximately on line 3—3 of Fig. 1; Fig. 4 is a side view of the upper part of the mechanism; Fig. 5 is an end view of the entire mechanism; Fig. 6 is a central vertical section through the lower portion of the valve mechanism, on a plane at right angles to the plane of Fig. 3; and Figs. 7 and 8 are sections taken respectively on line 7—7 and line 8—8 of Fig. 6.

Referring to the drawings, 1 represents a valve casing that may conveniently be in the form of a hollow vertical cylinder or shell closed at the top and bottom. Within the casing are radial partitions 2 that terminate short of the center of the casing so as to separate the interior of the casing into a series of outer chambers 3 which I shall designate as outlet chambers, and another chamber 4 which I shall designate the inlet chamber, arranged in a circle about a central chamber 5 of frusto-conical form having its small end at the top. The inner ends of the two radial partitions between which lies the chamber 4 are joined by a wall 6. Consequently, the chambers 3 communicate directly with the central frusto-conical chamber, whereas the inlet chamber is shut off from the central chamber. The chambers continue down below the lower end of the central frusto-conical chamber and are closed on their inner ends by an annular wall 7 which with the bottom wall or head 8 of the casing, forms another chamber 9 directly below the frusto-conical chamber. As will be apparent from Fig. 6, the lower end of the inlet chamber 4 communicates with or opens into the chamber 9.

Within the frusto-conical chamber is a plug valve 10 in the form of an inverted cup, the closed end of which is spaced apart from the top wall or head 11 of the casing, the periphery of the valve normally resting in wedging contact against the inner surfaces of the chamber 5. In one side of the cup is a port 12 which may be in the form of a long, wide slot. The valve is fixed to the lower end of a stem 13 that projects up through the head 11 and a suitable stuffing box 14. The lower end of the stem rests on a spring 15 arranged in a suitable socket 16 on the upper side of the lower head or bottom wall of the casing.

An inlet or supply pipe 18 is connected to the chamber 4, and an outlet pipe 19 may be connected to each of the chambers 3. If not as many outlet pipes as there are chambers 3 are required, the openings leading therefrom may be closed by means of plugs, of which one is shown at 20.

It will be seen that with the valve standing in the position shown in Figs. 6, 7 and 8 of the drawings, upon opening a suitable valve in the supply pipe 18, steam will enter the chamber 4, pass down into the chamber 9 and up into the interior of the hollow valve, flowing from the valve through the port 12 into the chamber 3 diametrically opposite the chamber 4. When the valve is turned in the clockwise direction as viewed in Figs. 7 and 8, the ports in the three chambers 3, lying between that chamber which is shown to be in communication with the valve port and the chamber 4, will successively be brought into registration with the port in the valve; each of the chambers 3 being closed off when the next one is opened to the steam. When the port in the valve comes opposite the wall 6 of the chamber 4 steam can no longer flow out through the valve, all of the outlet pipes being shut off from the steam.

I have provided means for turning the valve step by step through its stem, and also means for "cracking" the valve just ahead of each turning movement, in order to permit the valve to be turned easily.

In the arrangement shown, there are four posts 22 rising from the top of the casing. Fixed to these posts are two parallel spiders or frames 23 and 24, spaced apart from each other. The valve stem extends up through the lower spider 23 and carries on its upper end a ratchet wheel 25. A cylinder 26, having its long axis transverse to the valve stem and a short distance above the upper end of the stem is fixed to corresponding edges of the frames or brackets 23 and 24. In the cylinder is a piston 27 having a long piston rod 28 extending through suitable stationary guides 29 and 30 across and in contact with the upper end of the valve stem. On the ratchet wheel is a downwardly projecting hub 31 and on the under side of the upper spider or frame is a hub 32. A yoke or bail 33 is journalled at the free ends of its arms on these hubs and carries a pawl 34 for cooperation with the ratchet wheel. The bail or yoke is connected to the free end of the piston rod by a long L-shaped member 35, the short arm of which is pivoted to the piston rod, as indicated at 37, and the long arm of which is connected to the bail or yoke by a pin 38 which may also be the pin that holds the pawl to the bail or yoke. The free end of the connecting rod and the corresponding part of the member 35 are covered by a casing or housing 39 fixed to the frames 23 and 24 directly opposite the cylinder. A set screw 40 passes through the end wall of the casing or housing in alignment with the piston rod and serves as a stop to limit the extent of movement of the piston in making a working stroke. There is also a spring 41 abutting at one end against the same wall of the casing or housing that contains the set screw, at its other end against a shoulder 42 on the member 35. This spring serves to return the piston after the latter has made a working stroke and the steam behind the same has been exhausted.

When the valve is in any one of its various positions wherein steam is being admitted to one of the outlet pipes, or wherein all of the outlet pipes are closed off, and the piston is back in the cylinder, the pawl is out of engagement with the tooth of the ratchet wheel which will be driven thereby on the next working stroke of the piston, as shown, so that the piston will travel a substantial distance before the valve begins to turn. I utilize this preliminary movement of the piston to press the valve down slightly so that it will not have to be turned against the resistance between the valve and the surfaces engaging the same, against which surfaces it is normally held by the steam pressure. To this end the hub of the upper frame or spider is provided with a central bore 43 opening out of the lower end thereof. In this bore is a loose post 44, rounded at its ends and slightly longer than the distance from the closed end of the bore to the top of the piston rod. The bore is enlarged toward the bottom, so that the post may stand either in a vertical position, or slightly inclined to the vertical, with its lower end shifted toward the cylinder. It will be seen that the hub on the ratchet wheel stands clear of the lower frame or spider 23 when the post is in its inclined position. In order to permit the post to stand straight, the piston rod and the valve stem must be pressed down slightly, this being permitted by the clearance under the hub of the ratchet wheel and the spring on which the lower end of the valve stem rests. This movement need not be great so that, by placing the guide bearings for the piston rod, 29 and 30, far enough apart, the portion of the rod spanning the space between these guides may be deflected downwardly far enough to permit the post to straighten. In the arrangement shown, the piston rod has wearing plates 45 and 46 on the top and the bottom to engage respectively with the upper end of the valve stem and the lower end of the wobbling post. The wearing plate 46 has in the top, near the end farthest removed from the piston, a seat or depression 47 in which the lower end of the post rests when the piston is at the end of its return stroke as shown in Fig. 3 of the drawings. Consequently, when the piston starts on a working stroke, the post is first swung into a position in which it is aligned with the valve stem, and then rides up out of the seat upon the top of the wearing plate 46, thereby gradually forcing the valve away from its seat. This occurs during that part of the stroke of the piston that is bringing the pawl into engagement with the ratchet tooth which it is to drive so that, by the time the ratchet wheel begins to turn, the valve will have been forced away from its seat.

The seat for the upper end of the wobbling post may be formed in the lower end of a set screw 48 screwed down into the bore 43, in order to permit the parts to be properly adjusted initially and also after wear takes place. The sloping side of the bore 20 is preferably made to lie at a somewhat greater angle than is necessary, in order to avoid the necessity for extreme accuracy in the construction of the parts; a spring pressed pin 49 engaging with the side of the post toward the piston and tending constantly to push the post into its straight or vertical position, so that it will never swing farther toward the piston than is necessary in order for it to remain in the seat 47 after its drops into the seat again on the return stroke of the piston. In the arrangement shown, the pin slides in a hole in a plug 50 screwed into the side of the hub 32 and having within the same, behind the pin, a small spring 51.

The piston may conveniently be operated by steam supplied from the steam chamber 4 through a pipe 52 leading to a valve casing 53 beside and conveniently cast integral with the cylinder 26. The valve casing 53 has a cylindrical bore 54 extending through the same. Fitted into this bore is a sleeve 55 closed at one end by a plug 56 screwed into the end of the bore 54 and at its other end by a stuffing box 57. The sleeve has a port 58 registering with the adjacent end of the steam pipe 52, and an exhaust port 59 at some distance from this inlet port. On the opposite side of the sleeve is a port 60 registering with an inlet and exhaust passage 61 leading into the interior of the cylinder behind the piston. The sleeve has therein a transverse partition or barrier 62 lying between the inlet port 58 and the ports 59 and 60. In the sleeve is a slide valve comprising cylindrical sections 63 and 64 lying on opposite sides of the partition and connected together by a neck 65 extending through an opening in the partition. The end of the part 63 is shaped to serve as a valve to close the opening in the partition.

The parts are so proportioned that when they are in the positions shown in Fig. 2, the cylinder is connected to atmosphere. Upon moving the compound valve toward the left, by means of a stem 66 passing out through the stuffing box, the exhaust port 59 is closed by the part 64 of the valve and the part 63 of the valve moves toward the left beyond the port 58, so that steam can pass from the pipe 52 through the opening in the partition 53, port 60 and passage 61, into the cylinder. Consequently, the piston will start on its working stroke and, after reaching the end thereof will remain there until the controlling valve therefor is restored to the position shown, whereupon the steam will escape from behind it, and the spring 41 will force the piston back.

The slide valve may be actuated in any suitable way as, for example, by means of a solenoid 67.

It will thus be seen that I have produced a simple and novel valve to admit steam or other fluid under pressure coming through a supply pipe to a series of outlet pipes in succession; a simple and novel means for moving a rotary valve held to its seat by the pressure of the fluid which it controls away from its seat before the turning movement begins; and a simple and novel actuating means for a rotary valve.

For the sake of brevity I have illustrated and described in detail only a preferred form of my invention embodying all of the novel features in a single power-operated valve mechanism adapted successively to connect a series of pipes, as, for example, the cleaning tubes of a soot cleaner, to a source of steam. It will therefore be understood that my invention is not limited to the details thus illustrated and described, but includes all forms and arrangements embodying the principles of my invention as set forth in the definitions of the invention constituting the appended claims.

I claim:

1. The combination with a valve casing having a rotary valve mounted so as to be capable of moving a limited distance in the axial direction and adapted to be held at one end of its axial movement by the pressure of the fluid controlled thereby, of means for turning the valve including a member movable across and in engagement with the end of the valve, a wobbling post between said member and the casing near the axis of the valve and normally standing at an acute angle to said axis, and a part on said member engaging with said post and causing it to be shifted from said normal position into one more nearly straight during the first part of the movement of said member.

2. The combination with a valve casing having a rotary valve mounted so as to be capable of moving a limited distance in the axial direction and adapted to be held at one end of its axial movement by the pressure of the fluid controlled thereby, of means for turning the valve including a member movable across and in engagement with the end of the valve, a wobbling post between said member and the casing near the axis of the valve and normally standing at an acute angle to said axis, and there being recesses for the ends of the post on the casing and said member, respectively, to cause the post to be swung into a position more nearly straight during the first part of the actuating movement of said member.

3. The combination with a valve casing having a rotary valve mounted so as to be capable of moving a limited distance in the axial direction and adapted to be held at one end of its axial movement by the pressure of the fluid controlled thereby, of means for turning the valve including a member movable across and in engagement with the end of the valve, a wobbling post between said member and the casing near the axis of the valve and normally standing at an acute angle to said axis, and there being recesses for the ends of the posts on the casing and said member, respectively, to cause the post to be swung into a position more nearly straight during the first part of the actuating movement of said member, the seat in said member being shaped to pass from under and beyond the post after the said member has travelled far enough to shift the post as aforesaid.

4. The combination with a valve casing having a rotary valve mounted so as to be capable of moving a limited distance in the axial direction and adapted to be held at one end of its axial movement by the pressure of the fluid controlled thereby, of means including a reciprocatory member for turning the valve, a wobbling post beyond the valve near the axis of the valve and normally standing at an acute angle to said axis with its outer end engaged with the casing, and means on said member to cause the post to be swung toward said axis to move the valve axially during the first part of the actuating stroke of said member and remain in the latter position during the completion of such stroke of said member.

5. The combination with a valve casing having a rotary valve mounted so as to be capable of moving a limited distance in the axial direction and adapted to be held at one end of its axial movement by the pressure of the fluid controlled thereby, a wobbling post engaged at its outer end with the casing near the axis of the valve and normally standing at an acute angle to said axis, and means for swinging said post from said normal position toward said axis to move said valve axially against the fluid pressure and then turning the valve.

6. In a valve mechanism, a rotary valve capable of moving endwise a limited distance, a ratchet wheel fixed to said valve, a pawl, and means first to shift the valve endwise slightly and then bring the pawl into driving relation to the ratchet wheel and causing the valve to turn.

7. In a valve mechanism, a casing having therein a transverse partition dividing it into an upper chamber and a lower chamber, radial partitions dividing the upper chamber into a central frusto-conical chamber surrounded by a plurality of separate outlet chambers and an inlet chamber, a blank wall connecting together the two radial partitions between which the inlet chamber lies, the lower end of the inlet chamber opening into the said lower chamber in the casing, a rotary frusto-conical valve in said frusto-conical chamber in the form of an inverted cup, the side wall of the cup having a port in position to register with each of the aforesaid outlet chambers in succession as the valve is turned and to be closed by said blank wall when in registration therewith, and said transverse partition having therein a large opening placing the lower chamber in the casing in communication with the interior of the valve.

In testimony whereof, I sign this specification.

FRED C. AREY.